United States Patent
Ogasawara et al.

(10) Patent No.: US 7,060,144 B2
(45) Date of Patent: Jun. 13, 2006

(54) CERAMIC CAPACITOR AND METHOD FOR THE MANUFACTURE THEREOF

(75) Inventors: Jun Ogasawara, Tokyo (JP); Youichi Mizuno, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 65 days.

(21) Appl. No.: 10/827,235

(22) Filed: Apr. 20, 2004

(65) Prior Publication Data

US 2004/0194870 A1 Oct. 7, 2004

Related U.S. Application Data

(62) Division of application No. 10/292,595, filed on Nov. 13, 2002, now Pat. No. 6,743,518.

(30) Foreign Application Priority Data

Nov. 14, 2001 (JP) ............................. 2001-348197

(51) Int. Cl.
*B32B 31/26* (2006.01)
*H01G 4/10* (2006.01)

(52) U.S. Cl. ............................ 156/89.14; 156/89.16; 361/321.2; 361/321.3; 361/321.4

(58) Field of Classification Search ............ 156/89.12, 156/89.14, 89.16; 361/320, 321.1, 321.2, 361/321.3, 321.4, 321.5; 428/210; 501/136, 501/137, 138, 139
See application file for complete search history.

(56) References Cited

U.S. PATENT DOCUMENTS

| 3,619,744 | A | * | 11/1971 | Stephenson | 361/321.4 |
|---|---|---|---|---|---|
| 4,503,482 | A | | 3/1985 | Hennings et al. | 361/321.4 |
| 4,764,494 | A | * | 8/1988 | Sakabe et al. | 501/138 |
| 4,882,652 | A | | 11/1989 | Furukawa et al. | 361/321.5 |
| 4,925,817 | A | * | 5/1990 | Ikeda et al. | 501/138 |
| 5,094,987 | A | | 3/1992 | Kagata et al. | 501/136 |
| 5,208,727 | A | | 5/1993 | Okamoto et al. | 361/321.4 |
| 5,397,753 | A | * | 3/1995 | Nishiyama et al. | 501/138 |
| 5,757,610 | A | * | 5/1998 | Wada et al. | 361/311 |
| 5,790,367 | A | * | 8/1998 | Mateika et al. | 361/321.4 |
| 5,990,029 | A | * | 11/1999 | Satoh et al. | 501/138 |
| 5,995,360 | A | | 11/1999 | Hata et al. | 361/321.5 |
| 6,008,981 | A | * | 12/1999 | Harada et al. | 361/321.4 |
| 6,074,970 | A | * | 6/2000 | Yamashita et al. | 501/138 |
| 6,174,831 | B1 | * | 1/2001 | Furukawa et al. | 501/138 |
| 6,185,087 | B1 | * | 2/2001 | Park et al. | 361/321.4 |
| 6,233,134 | B1 | * | 5/2001 | Sakamoto et al. | 361/311 |
| 6,344,427 | B1 | * | 2/2002 | Komatsu et al. | 501/138 |
| 6,346,497 | B1 | * | 2/2002 | Nakamura et al. | 501/138 |
| 6,544,916 | B1 | * | 4/2003 | Sato et al. | 501/137 |
| 6,579,394 | B1 | * | 6/2003 | Nakamura et al. | 156/89.12 |
| 6,628,502 | B1 | * | 9/2003 | Masumiya et al. | 361/321.2 |

(Continued)

FOREIGN PATENT DOCUMENTS

EP 324619 A1 7/1989

(Continued)

*Primary Examiner*—Melvin Mayes
(74) *Attorney, Agent, or Firm*—Bacon & Thomas, PLLC

(57) ABSTRACT

A ceramic capacitor has at least one dielectric layer and at least two electrodes having the dielectric layers therebetween. The dielectric layer includes a sintered body of ceramic grains containing a primary component of a perovskite crystal structure in a form of $ABO_3$ and a ratio A/B of outer portions of the ceramic grains is greater than that of an inner portions thereof.

4 Claims, 1 Drawing Sheet

U.S. PATENT DOCUMENTS

| | | | |
|---|---|---|---|
| 6,727,200 B1 * | 4/2004 | Maher et al. | 501/139 |
| 6,764,976 B1 * | 7/2004 | Kobayashi et al. | 501/139 |
| 2002/0013213 A1 * | 1/2002 | Sato et al. | 501/139 |
| 2002/0020483 A1 * | 2/2002 | Wada et al. | 156/89.14 |
| 2002/0074154 A1 * | 6/2002 | Kim et al. | 174/137 B |
| 2002/0091059 A1 * | 7/2002 | Venigalla et al. | 501/137 |
| 2002/0150777 A1 * | 10/2002 | Kerchner et al. | 428/469 |
| 2004/0248724 A1 * | 12/2004 | Venigalla et al. | 501/137 |

FOREIGN PATENT DOCUMENTS

| | | | |
|---|---|---|---|
| EP | 992469 A2 | | 4/2000 |
| JP | 05-174626 | * | 7/1993 |
| JP | 05-242730 | * | 9/1993 |
| JP | 11147716 A | | 6/1999 |
| JP | 2002029835 A | | 1/2002 |
| JP | 2002-255639 | * | 9/2002 |

* cited by examiner

CERAMIC CAPACITOR AND METHOD FOR THE MANUFACTURE THEREOF

CROSS REFERENCE TO RELATED APPLICATIONS

This application is a divisional application of U.S. application Ser. No. 10/292,595, filed Nov. 13, 2002 (of which the entire disclosure of the prior application is hereby incorporated by reference) now U.S. Pat. No. 6,743,518.

FIELD OF THE INVENTION

The present invention relates to a ceramic capacitor and method for manufacturing same; and, more particularly, to a ceramic capacitor having prolonged lifetime by using a precise control of a dielectric layer composition and a manufacturing method therefor.

BACKGROUND OF THE INVENTION

Generally, a ceramic capacitor includes a chip-shaped sintered body and a pair of electrodes formed at two opposite sides thereof. In case of a multi-layer ceramic capacitor, the sintered body is generally made of alternately laminated dielectric layers and internal electrodes. Every two neighboring internal electrodes face each other through a dielectric layer disposed therebetween, and are electrically coupled to different external electrodes, respectively.

The dielectric layer is formed of a reduction-resistant dielectric ceramic, which includes ceramic grain primarily composed of $BaTiO_3$, and an additive having a glass component serving to combine the ceramic grains. The internal electrodes are made of sintered conductive paste primarily composed of, e.g., Ni metal powder. Sintering as defined herein represents a process in which individual particles are densified through modification and bonding below melting point thereof to have a poly-crystalline structure in a shape of mass.

The sintered body is made by performing removal of binder from alternately laminated ceramic green sheets and internal electrode patterns, sintering in a non-oxidizing atmosphere at a high temperature of about 1200~1300° C., and thereafter re-oxidizing under a mild oxidation condition.

If a ratio of Ba/Ti(A/B) of $BaTiO_3$ contained in the dielectric layers is equal to or less than 1.000 and sintering is performed in a reducing atmosphere, the sintered product does not function as a capacitor, since the constituents of the dielectric ceramic become semi-conductive during sintering and thus insulating properties thereof is deteriorated. To improve reduction-resistant properties of the dielectric ceramic, a ratio A/B of $BaTiO_3$ is required to be greater than 1.000. For making A/B greater than 1.000, it has been proposed to put an A-site component such as barium, strontium, and calcium greater than a stoichiometric ratio.

However, when sintering the dielectric ceramic having thus enhanced reduction-resistant characteristics, the A-site component of the perovskite crystal structure diffuses to grain boundaries so that the ratio A/B of ceramic grains becomes lowered. Therefore, reduction-resistance of the dielectric ceramic is deteriorated and oxygen deficiencies increase, resulting in a lifetime, i.e., a reliability, of a ceramic capacitor to be degraded.

SUMMARY OF THE INVENTION

It is, therefore, an object of the present invention to provide a ceramic capacitor and a method for the manufacture thereof, which has a prolonged lifetime and high reliability, wherein an A-site component of the perovskite crystal structure is prevented from diffusing into grain boundaries and thus the reduction of the ratio A/B in ceramic grains is effectively suppressed and the reduction resistance thereof is guaranteed.

In accordance with one aspect of the present invention, there is provided a ceramic capacitor having at least one dielectric layer and at least two electrodes having the dielectric layer therebetween, wherein the dielectric layer is formed of a dielectric ceramic having a sintered ceramic grain of a perovskite crystal structure in a form of $ABO_3$, a ratio A/B of an outer portion of the ceramic grain is greater than that of an inner portion of the ceramic grain.

In such structure, the A-site component of the perovskite crystal structure will not be diffused to grain boundaries and reduction-resistance of the outer portion of a ceramic grain can be improved. Accordingly, the ceramic capacitor in accordance with the present invention has an improved reduction resistant dielectric layer, which gives rise to prolonged lifetime, and improved electric characteristics such as insulating resistance.

Herein, a dielectric ceramic of the present invention is preferably $BaTiO_3$ or $SrTiO_3$ based ceramic. However, other alternative dielectric ceramic may also be used if it is composed of sintered ceramic grains having the perovskite crystal structure.

The drawing of the invention shows ceramic grains, outer portions thereof, inner portions thereof, and grain boundaries of a sintered body. The outer portion of a ceramic grain indicates a portion of the ceramic grain from the outer surface toward the center thereof up to about 10 nm in depth and the inner portion of a ceramic grain represents a portion thereof inside the outer portion. The outer portion of a ceramic grain does not refer to a part of the grain boundary but a portion inside of the ceramic grain. A ratio of A/B, e.g., of $Ba_xTi_yO_3$, denotes molar ratio x/y of Ba and Ti.

In the perovskite crystal structure of the present invention, a ratio A/B of the outer portions of ceramic grains composing a sintered ceramic body is greater than that of the center portions thereof. In such a structure, an A-site component of the perovskite structure would not diffuse to grain boundaries. The ratio A/B of the outer portions of the ceramic grains is preferably to be within a range of about $1.000 < A/B \leq 1.015$. If the ratio A/B is equal to or lower than about 1.000, reduction-resistance is reduced and required IR(insulation resistance) lifetime is not achieved, thereby deteriorating the reliability. On the other hand, if the ratio A/B is greater than about 1.015, required sintered features and electrical characteristics or required growth of grain and electrical characteristics cannot be achieved. However, within such range of $1.000 < A/B \leq 1.015$, required electrical properties can be achieved.

It is also preferable that an amount of an A-site component ranging from about 0.05 to 0.1 mole per 100 moles of a primary component forming the ceramic grain is included in an additive containing a glass component to be used in combining ceramic grains. If the A-site component is included less than about 0.05 mole, the A-site component diffuses from the outer portions of the ceramic grains into the grain boundaries and the ratio A/B at the outer portions is lowered, which reduces reduction-resistance, thereby deteriorating the reliability. If the A-site component is included more than about 0.1 mole, the A-site component becomes a surplus and as a result the ratio A/B of the ceramic grains in the outer portions exceeds 1.015, thereby making it impossible to get the required growth of grain and electrical properties. On the other hand, if the A-site component is included within a range from about 0.05 to 0.1 mole, the diffusion of the A-site component from the ceramic grains into the grain boundaries is suppressed and the ratio A/B of ceramic grains is not allowed to be lowered, which yields the ratio A/B of the outer portions to be greater than that of the inner portion and also the ratio A/B of the outer portions to be within the range of about $1.000 < A/B \leq 1.015$, thereby enabling the required electrical properties to be obtained.

In accordance with another aspect of the invention, there is provided a method for manufacturing a ceramic capacitor including the steps of making unsintered ceramic powder, forming ceramic green sheets by mixing the uncalcined ceramic powder and an organic binder, printing internal electrodes on the ceramic green sheets to provide electrode printed green sheets, laminating the electrode printed green sheets, cutting the laminated ceramic green sheets according to the printed internal electrodes pattern to provide chip-shaped laminated bodies, and sintering the chip-shaped laminated bodies, wherein the unsintered ceramic powder includes a primary component of a perovskite crystal structure in a form of $ABO_3$ and an additive containing an A-site component of the perovskite crystal structure.

The unsintered ceramic powder is e.g., $BaTiO_3$ and $SrTiO_3$ family, but other alternative ceramic powder that can form a sintered ceramic body having perovskite crystal structure may be used.

Further, as an additive having, e.g., $SiO_2$, $Li_2O$, $B_2O_3$ or a combination thereof as a main component can be used, but other alternative may be included in the additive.

It is preferable for an amount of the additive to be ranged from about 0.1 to 1.0 part by weight with respect to 100 moles of a primary component forming the ceramic grains. If the amount of the additive is less than about 0.1 part by weight, a required growth of grain and electrical properties cannot be obtained, whereas if the amount of the additive is greater than 1.0 part by weight, a growth of grain is hard to control for obtaining the required electrical properties or excessive growth of grains may occur, resulting in degraded reliability. However, the amount of additive ranging from about 0.1 to 1.0 part by weight makes it possible to obtain the required electrical properties.

Further, one or more components selected from the group consisting of barium, calcium, and strontium may be used as the A-site component included in the additive, but other alternative material may also be used.

It is also preferable that an amount of an A-site component ranging from about 0.05 to 0.1 mole per 100 moles of a primary component forming the ceramic grain is included in an additive containing a glass component to be used in combining the ceramic grains. If the A-site component is included less than about 0.05 mole, the A-site component diffuses from the outer portions of the ceramic grains into the grain boundaries and the ratio A/B at the outer portions is lowered, which reduces reduction-resistance, thereby deteriorating the reliability. If the A-site component is included more than about 0.1 mole, the A-site component becomes a surplus and as a result the ratio A/B of the ceramic grains in the outer portions exceeds 1.015, thereby making it impossible to get the required growth of grain and electrical properties. On the other hand, if the A-site component is included within a range from about 0.05 to 0.1 mole, the diffusion of the A-site component from the ceramic grains into the grain boundaries is suppressed and the ratio A/B of ceramic grains is not allowed to be lowered, which yields the ratio A/B of the outer portions to be greater than that of the inner portion and also the ratio A/B of the outer portions to be within the range of about $1.000 < A/B \leq 1.015$, thereby enabling the required electrical properties to be obtained.

BRIEF DESCRIPTION OF THE DRAWINGS

The above and other objects and features of the present invention will become apparent from the following description of preferred embodiments given in conjunction with the accompanying drawing, in which FIG. 1 schematically shows ceramic grains 1, outer portions thereof 2, inner portions thereof 5, and grain boundaries 4 of a sintered body 3.

DETAILED DESCRIPTION OF THE PREFERRED EMBODIMENTS

EXAMPLE 1

Figure 1:
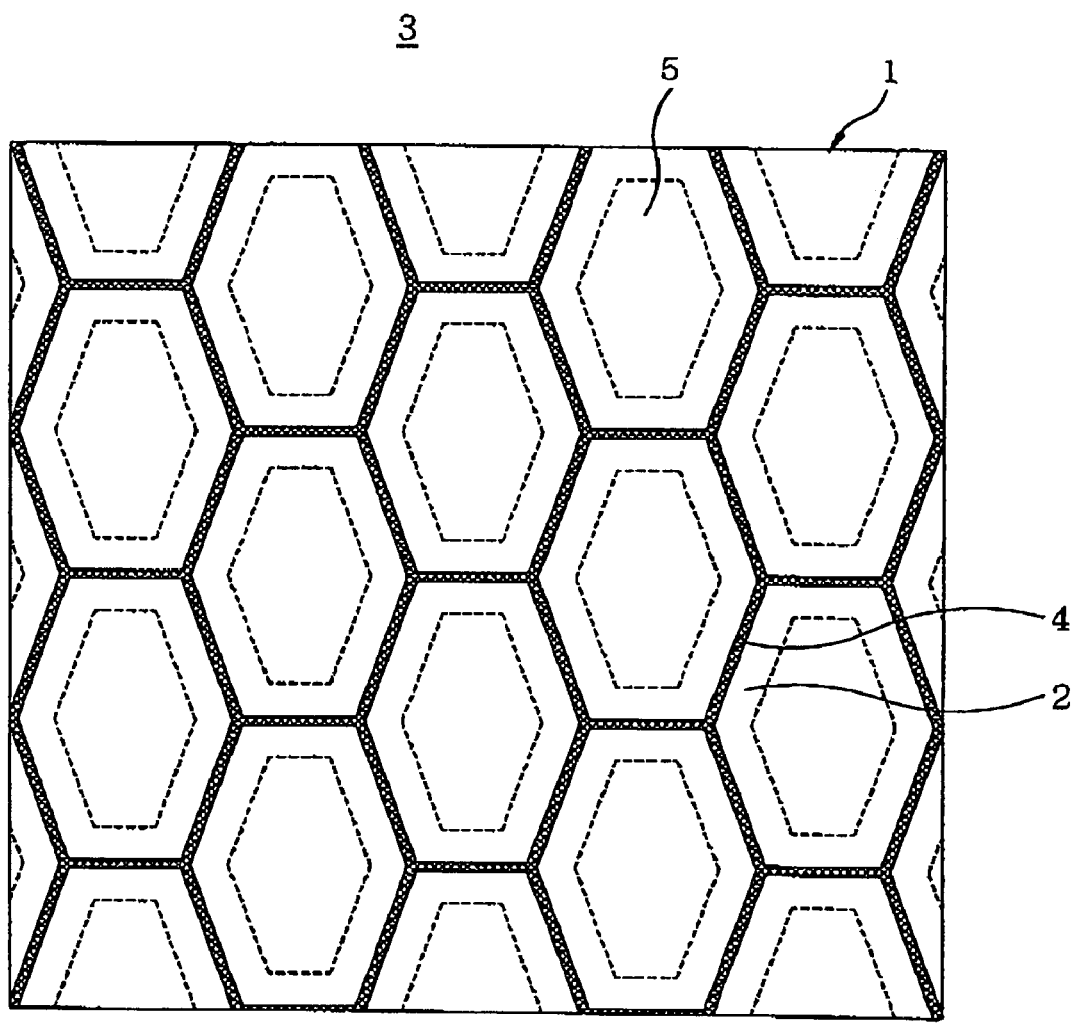

A-site components having a molar ratio of $Ba:Ca=0.90:0.10$ and B-site components having a molar ratio of $Ti:Zr=0.850:0.150$ were calcined for forming a primary component $Ba_{1-x}Ca_xTi_{1-y}Zr_yO_3$.

Next, with respect to 100 moles of the primary component $Ba_{1-x}Ca_xTi_{1-y}Zr_yO_3$, 1.0 mole of Mn and 1.0 mole of Ho were added thereto as minor additives and then mixed and stirred for 15 hours in a ball mill.

Tetraethoxysilane was slowly added to 100 ml of ethanol by using a dropping pipette so that 0.7 part by weight of $SiO_2$ was present in the solution with respect to 100 moles of the primary component and stirred at room temperature for 15 minutes. Further, barium acetate was weighed so that about 0 to 0.12 mole of barium was present with respect to 100 moles of the primary component(not including $SiO_2$ powder, Mn and Ho) and fully dissolved in ethylene glycol. Above-obtained solution was added to the tetraethoxysilane solution slowly and stirred at room temperature for 15 minutes for obtaining sol.

Next, the above-obtained sol was added to the BaCaTiZrO_3 slurry, and the mixture was stirred for 30 minutes in a ball mill and dried to obtain various types of unsintered ceramic powders in which about 0 to 0.12 mole of barium was present with respect to 100 moles of the primary component.

Next, by using the unsintered ceramic powder, ceramic slurry was obtained, from which ceramic green sheets, each having a thickness of about 5 μm, were obtained. Thereafter, internal electrodes were printed on the ceramic green sheets and 10 ceramic green sheets were laminated, followed by removing binder therefrom, and sintering at high temperature, consequently obtaining various ceramic capacitors.

Next, a ratio A/B of outer portions, i.e., portions from surface to 10 nm in depth toward center, of the ceramic grains forming dielectric layers of the ceramic capacitors and a ratio A/B of inner portions of the ceramic grains were examined, respectively, wherein the ratio A/B of inner portions were sampled from points about 10 nm below the outer portions (i.e., about 20 nm below the surfaces of the ceramic grains). The result of the examination is described in test specimen numbers 1 to 10 of Table 1. In addition, an IR lifetime of the ceramic capacitor is also described.

The ratio A/B of the outer portions and inner portions of ceramic grains were tested by spot quantitative analysis by using a TEM-EDX method for 50 ceramic grains, wherein 10 spots for each of the outer portion and inner portion of every grain were examined, and 4 significant figures (rounded up to the third floating point) were measured and averaged. The IR lifetime of the ceramic capacitor was defined as the duration of time at which an order of resistance was changed when a voltage of 20V/μm was applied at a temperature of 200° C. This is equally applied to the following EXAMPLES 2 and 3.

As seen in test specimen numbers 4 to 9 of Table 1, barium contained in the additive in an amount ranging from about 0.05 to 0.1 mole yielded the ratio A/B of the outer portions of the ceramic grains that ranged from 1.000 to 1.015 and satisfied required lifetime characteristics(IR lifetime over 2 hours). On the other hand, when the amount of barium contained in the additive was less than about 0.05 mole as in the test specimen numbers 1 to 3, the ratio A/B of the outer portions of the ceramic grains became no more than 1.000 and could not satisfy required lifetime. In addition, when the amount of barium contained in the additive was more than about 0.1 mole as in the test specimen number 10, the ratio A/B of the outer portions of the ceramic grains became greater than 1.015, so that a required sintering, electrical properties or growth of grain could not be obtained.

EXAMPLE 2

A-site components having a molar ratio of Ba:Ca=0.95:0.05 and B-site components having a molar ratio of Ti:Zr=0.920:0.080 were calcined for forming a primary component $Ba_{1-x}Ca_xTi_{1-y}Zr_yO_3$.

Next, with respect to 100 moles of the primary component $Ba_{1-x}Ca_xTi_{1-y}Zr_yO_3$, 1.0 mole of Mn and 1.5 moles of Ho were added thereto as minor additives and then mixed and stirred for 15 hours in a ball mill.

And, tetraethoxysilane was slowly added to 100 ml of ethanol by using a dropping pipette so that about 0.9 part by weight of $SiO_2$ was present in the solution with respect to 100 moles of the primary component and stirred at room temperature for about 15 minutes. Further, barium acetate was weighed so that about 0 to 0.12 mole of barium was present with respect to 100 moles of the primary component and fully dissolved in ethylene glycol. Above-obtained solution was slowly added to the tetraethoxysilane solution and stirred at room temperature for 15 minutes for obtaining sol.

Next, the above-obtained sol was added to the BaCaTiZrO$_3$ slurry and the mixture was stirred for 30 minutes in a ball mill and dried to obtain various types of unsintered ceramic powders in which about 0 to 0.12 mole of barium was present with respect to 100 moles of the primary component.

Next, by using the unsintered ceramic powder, ceramic slurry was obtained, from which ceramic green sheets, each having a thickness of about 5 μm, were obtained. Thereafter, internal electrodes were printed on the ceramic green sheets and 10 ceramic green sheets were laminated, followed by removing binder therefrom, and sintering at high temperature, consequently obtaining various ceramic capacitors.

Next, a ratio A/B of outer portions, i.e., portions from surface to 10 nm in depth toward center, of the ceramic grains forming dielectric layers of the ceramic capacitors and a ratio A/B of inner portions of the ceramic grains were examined, respectively, wherein the ratio A/B of inner portions were sampled from points about 10 nm below the outer portions (i.e., about 20 nm below the surfaces of the ceramic grains). The result of the examination is described in test specimen numbers 11 to 20 of Table 1. In addition, an IR lifetime of the ceramic capacitor is also described.

As seen in test specimen numbers 14 to 19 of Table 1, barium contained in the additive in an amount ranging from about 0.05 to 0.1 mole yielded the ratio A/B of the outer portions of the ceramic grains that ranged from 1.000 to 1.015 and satisfied required lifetime characteristics. On the other hand, when the amount of barium contained in the additive was less than about 0.05 mole as in the test specimen numbers 11 to 13, the ratio A/B of the outer portions of the ceramic grains became no more than 1.000 and could not satisfy required lifetime. In addition, when the amount of barium contained in the additive was more than about 0.1 mole as in the test specimen number 20, the ratio A/B of the outer portions of the ceramic grains became greater than 1.015, so that a required sintering, electrical properties or growth of grain could not be obtained.

EXAMPLE 3

A-site components having a molar ratio of Ba:Ca=0.90:0.10 and B-site components having a molar ratio of Ti:Zr=0.850:0.150 were calcined for forming a primary component $Ba_{1-x}Ca_xTi_{1-y}Zr_yO_3$.

Next, with respect to 100 moles of the primary component $Ba_{1-x}Ca_xTi_{1-y}Zr_yO_3$, 1.0 mole of Mn and 1.0 mole of Ho were added thereto as minor additives and then mixed and stirred for 15 hours in a ball mill.

And, tetraethoxysilane was slowly added to 100 ml of ethanol by using a dropping pipette so that about 0.05 to 1.30 part by weight of $SiO_2$ was present in the solution with respect to 100 moles of the primary component and stirred at room temperature for about 15 minutes. Further, barium acetate was weighed so that about 0.07 mole of barium was present with respect to 100 moles of the primary component and fully dissolved in ethylene glycol. Above-obtained solution was slowly added to the tetraethoxysilane solution and stirred at room temperature for 15 minutes for obtaining sol.

Next, the above-obtained sol was added to the BaCaTiZrO$_3$ slurry and the mixture was stirred for 30 minutes in a ball mill and dried to obtain various types of unsintered ceramic powders in which about 0.05 to 4.00 part by weight of the additive including $SiO_2$ was present.

Next, by using the unsintered ceramic powder, ceramic slurry was obtained, from which ceramic green sheets, each having a thickness of about 5 μm, were obtained. Thereafter, internal electrodes were printed on the ceramic green sheets and 10 ceramic green sheets were laminated, followed by removing binder therefrom, and sintering at high temperature, consequently obtaining various ceramic capacitors.

Next, a ratio A/B of outer portions, i.e., portions from surface to 10 nm in depth toward center, of the ceramic grains forming dielectric layers of the ceramic capacitors and a ratio A/B of inner portions of the ceramic grains were examined, respectively, wherein the ratio A/B of inner portions were sampled from points about 10 nm below the outer portions (i.e., about 20 nm below the surfaces of the ceramic grains). The result of the examination is described in test specimen numbers 21 to 28 of Table 1. In addition, an IR lifetime of the ceramic capacitor is also described.

As shown in test specimen numbers 22 to 26 of Table 1, an amount of additive ranging from about 0.1 to 1.0 part by weight satisfies required lifetime of the capacitor. On the other hand, when the amount of the additive less than 0.1 part by weight with respect to 100 moles of the primary component was added, as shown in test specimen number 21, sintered characteristics were deteriorated so that a required growth of grain and electrical properties could not be obtained. When the amount of additive exceeded about 1.0 part by weight, as shown in specimen numbers 27 and 28, controlling the growth of grain became difficult, i.e., resulting in an excess growth of grain, thereby deteriorating the reliability of the ceramic capacitor.

quently used in forming ceramic capacitors as in EXAMPLE 1. A ratio A/B of outer portions, i.e., portions from surface to 10 nm depth toward center of the ceramic grains forming dielectric layers of the ceramic capacitor and a ratio A/B of inner portions thereof were examined, respectively, wherein the ratio A/B of inner portions were sampled from points about 10 nm below the outer portions (i.e., about 20 nm below the surfaces of the ceramic grains). The result of the examination is described in Table 1 in test specimen num-

TABLE 1

| | Primary Material | | | | | | Minor Additive | | Additive | | A/B Ratio | | IR Life |
|---|---|---|---|---|---|---|---|---|---|---|---|---|---|
| | A-site Component | | | B-site Component | | | | | | | | | |
| No. | Ba | Ca | Sr | Ti | Zr | Mn | Ho | $SiO_2$ | Ba | Outer | Inner | time |
| *1 | 0.90 | 0.10 | — | 0.850 | 0.150 | 1.0 | 1.0 | 0.7 | 0.00 | 0.927 | 1.000 | 0.32 |
| *2 | " | " | — | " | " | " | " | " | 0.02 | 0.994 | 1.000 | 0.54 |
| *3 | " | " | — | " | " | " | " | " | 0.04 | 0.999 | 1.000 | 0.98 |
| 4 | " | " | — | " | " | " | " | " | 0.05 | 1.001 | 1.000 | 2.62 |
| 5 | " | " | — | " | " | " | " | " | 0.06 | 1.002 | 1.000 | 3.55 |
| 6 | " | " | — | " | " | " | " | " | 0.07 | 1.006 | 1.000 | 5.10 |
| 7 | " | " | — | " | " | " | " | " | 0.08 | 1.009 | 1.000 | 4.61 |
| 8 | " | " | — | " | " | " | " | " | 0.09 | 1.012 | 1.000 | 3.98 |
| 9 | " | " | — | " | " | " | " | " | 0.10 | 1.015 | 1.000 | 2.53 |
| *10 | " | " | — | " | " | " | " | " | 0.12 | 1.020 | 1.000 | 1.98 |
| *11 | 0.95 | 0.05 | — | 0.920 | 0.080 | 1.0 | 1.5 | 0.9 | 0.00 | 0.929 | 1.000 | 0.08 |
| *12 | " | " | — | " | " | " | " | " | 0.02 | 0.950 | 1.000 | 0.09 |
| *13 | " | " | — | " | " | " | " | " | 0.04 | 0.999 | 1.000 | 0.10 |
| 14 | " | " | — | " | " | " | " | " | 0.05 | 1.001 | 1.000 | 2.01 |
| 15 | " | " | — | " | " | " | " | " | 0.06 | 1.003 | 1.000 | 3.64 |
| 16 | " | " | — | " | " | " | " | " | 0.07 | 1.006 | 1.000 | 6.51 |
| 17 | " | " | — | " | " | " | " | " | 0.08 | 1.010 | 1.000 | 6.54 |
| 18 | " | " | — | " | " | " | " | " | 0.09 | 1.013 | 1.000 | 4.41 |
| 19 | " | " | — | " | " | " | " | " | 0.10 | 1.014 | 1.000 | 2.53 |
| *20 | " | " | — | " | " | " | " | " | 0.12 | 1.017 | 1.000 | 1.97 |
| 21 | 0.90 | 0.10 | — | 0.850 | 0.150 | 1.0 | 1.0 | 0.05 | 0.07 | 1.004 | 1.000 | 0.08 |
| 22 | " | " | — | " | " | " | " | 0.10 | " | 1.003 | 1.000 | 2.12 |
| 23 | " | " | — | " | " | " | " | 0.30 | " | 1.006 | 1.000 | 3.04 |
| 24 | " | " | — | " | " | " | " | 0.50 | " | 1.005 | 1.000 | 3.70 |
| 25 | " | " | — | " | " | " | " | 0.70 | " | 1.006 | 1.000 | 5.10 |
| 26 | " | " | — | " | " | " | " | 1.00 | " | 1.005 | 1.000 | 4.11 |
| *27 | " | " | — | " | " | " | " | 1.10 | " | 1.001 | 1.000 | 1.98 |
| *28 | " | " | — | " | " | " | " | 1.30 | " | 0.999 | 1.000 | 0.70 |
| 29 | " | 0.05 | 0.05 | " | " | " | " | 0.90 | 0.06 | 1.002 | 1.000 | 3.50 |
| *30 | " | 0.10 | — | " | " | " | " | 0.7 | 0.07 | 0.999 | 1.000 | 0.08 |
| *31 | 0.95 | 0.05 | — | 0.920 | 0.080 | " | 1.5 | 0.9 | " | 0.999 | 1.000 | 0.09 |
| *32 | 0.90 | 0.10 | — | 0.850 | 0.150 | " | 1.0 | 0.50 | " | 0.999 | 1.000 | 0.10 |

1. Test specimen number marked by * is comparative example.
2. Unit of A-site and B-site component is mole.
3. The value of minor additives is mole with respect to 100 moles of the primary component.
4. Unit of $SiO_2$ is part by weight.

COMPARATIVE EXAMPLE

A-site components having a molar ratio of Ba:Ca=0.90:0.10 and B-site components having a molar ratio of Ti:Zr=0.850:0.150 were calcined to obtain the primary component $Ba_{1-x}Ca_xTi_{1-y}Zr_yO_3$, and then 1.0 mole of Mn and 1.0 mole of Ho serving as minor additives and $BaCO_3$ and $SiO_2$ functioning as an additive containing glass components were added for 100 moles of the primary component $Ba_{1-x}Ca_xTi_{1-y}Zr_yO_3$, which were then mixed and stirred for 15.5 hours in a ball mill to obtain unsintered ceramic powder.

Next, ceramic slurry was formed by using the thus obtained unsintered ceramic powder, which was subsebers 30 to 32. In addition, an IR lifetime of the ceramic capacitors is also described in Table 1 in test specimen numbers 30 to 32.

Besides EXAMPLES 1 to 3, employing strontium as an A-site component(test specimen number 29) and glass containing lithium and boron as an additive resulted in achieving the same results.

In the present invention, by putting an A-site component in an additive, its diffusion from the perovskite structured grains into grain boundaries is prevented and a ratio A/B of an outer portion of a ceramic grain greater than that of an inner portion thereof is realized. In case of the ratio A/B of the outer portions of the ceramic grains ranging from about 1.000 to 1.015, the ratio A/B of the inner portions may take on a different value other than 1.000 as was the case in Table 1. Accordingly, reduction-resistance is improved and the reliability of the product, such as insulating resistance or lifetime can be enhanced.

While the invention has been shown and described with respect to the preferred embodiments, it will be understood by those skilled in the art that various changes and modifications may be made without departing from the spirit and scope of the invention as defined in the following claims.

What is claimed is:

1. A method for manufacturing a ceramic capacitor, comprising the steps of:
   (a) making unsintered ceramic powder, wherein the unsintered ceramic powder includes a primary component of a perovskite crystal structure in a form of $ABO_3$ and an additive containing an A-site component of the perovskite crystal structure;
   (b) forming ceramic green sheets by mixing the unsintered ceramic powder and an organic binder;
   (c) printing internal electrodes on the ceramic green sheets to provide electrode printed green sheets;
   (d) laminating the electrode printed green sheets;
   (e) cutting the laminated ceramic green sheets according to the printed internal electrodes pattern to provide chip-shaped laminated bodies; and
   (f) sintering the chip-shaped laminated bodies to thereby produce a sintered body including ceramic grains, a ratio A/B of an outer portion of the ceramic grains being greater than that of an inner portion thereof;
   wherein the unsintered ceramic powder further includes tetraethoxysilane and the additive containing the A-site component is barium acetate.

2. The method of claim 1, wherein the A-site component ranging from about 0.05 to 0.1 mole is present in the additive with respect to 100 moles of the primary component.

3. The method of claim 2, wherein an amount of the additive is about 0.1 to 1.0 part by weight with respect to 100 moles of the primary component.

4. The method of claim 1, wherein the amount of the additive is about 0.1 to 1.0 part by weight with respect to 100 moles of the primary component.

* * * * *